(12) United States Patent
Hurley et al.

(10) Patent No.: US 8,569,999 B2
(45) Date of Patent: Oct. 29, 2013

(54) BATTERY CHARGER AND METHOD

(75) Inventors: William Gerard Hurley, Galway (IE); Yuksum Wong, Galway (IE); Werner Wölfle, Clonard (IE)

(73) Assignees: Convertec Ltd. (IE); National University of Ireland (IE)

( * ) Notice: Subject to any disclaimer, the term of this patent is extended or adjusted under 35 U.S.C. 154(b) by 743 days.

(21) Appl. No.: 12/277,095

(22) Filed: Nov. 24, 2008

(65) Prior Publication Data

US 2009/0140697 A1   Jun. 4, 2009

(30) Foreign Application Priority Data

Nov. 29, 2007   (EP) .................................... 07121927

(51) Int. Cl.
*H02J 7/00* (2006.01)

(52) U.S. Cl.
USPC .......................................... 320/144; 320/139

(58) Field of Classification Search
USPC ........................................................ 320/144
See application file for complete search history.

(56) References Cited

U.S. PATENT DOCUMENTS

| | | | |
|---|---|---|---|
| 4,065,712 A | 12/1977 | Godard et al. | |
| 4,862,013 A * | 8/1989 | Konopka | 320/145 |
| 5,307,000 A | 4/1994 | Podrazhansky et al. | |
| 5,422,560 A | 6/1995 | Yan | |
| 5,598,085 A | 1/1997 | Hasler | |
| 5,917,305 A * | 6/1999 | Faulk | 320/106 |
| 6,018,234 A * | 1/2000 | de Savasse | 320/153 |
| 6,624,618 B2 * | 9/2003 | Kernahan et al. | 322/90 |
| 2002/0036482 A1 | 3/2002 | Nakatsuji | |
| 2005/0068005 A1 | 3/2005 | Yamashita | |
| 2006/0132091 A1 * | 6/2006 | Felder et al. | 320/128 |
| 2006/0220620 A1 * | 10/2006 | Aradachi et al. | 320/150 |

FOREIGN PATENT DOCUMENTS

WO       9315543 A1    8/1993

OTHER PUBLICATIONS

Bhatt, Malhar, et al., "A New Approach to Intermittent Charging of Valve-Regulated Lead-Acid Batteries in Standby Applications", IEEE Transactions of Industrial Electronics, Oct. 2005, vol. 52, No. 5, pp. 1137-1342.

* cited by examiner

*Primary Examiner* — Drew A Dunn
*Assistant Examiner* — Robert Grant
(74) *Attorney, Agent, or Firm* — Onello & Mello, LLP

(57) ABSTRACT

The present invention relates to a method for compensating for temperature effects in a pulsed battery-charging scheme with an average charging current less than the root-mean-square (rms) current. The method comprises varying the ratio of the average charging current to rms current as a function of the battery ambient temperature. The method may also comprise varying an upper threshold charging voltage as a function of the battery ambient temperature.
The invention also relates to a battery charger.

10 Claims, 5 Drawing Sheets

BATTERY CHARGER AND METHOD

RELATED APPLICATIONS

This application relies for priority upon European Application No. 07121927.3, filed on Nov. 29, 2007, the contents of which are herein incorporated by reference in their entirety.

FIELD OF THE INVENTION

The present invention relates to battery charging. In particular, this invention relates to a battery charging system and method suitable for use in standby applications.

BACKGROUND TO THE INVENTION

One technique which is commonly used for charging Valve Regulated Lead Acid (VRLA) batteries, which are typically used in standby applications such as emergency systems, is known as float charging. However, it has been found that there are a number of drawbacks associated with float charging. These include the fact that the float charging regime overcharges the battery, and also causes excessive temperatures of the battery cells, which in turn degrades the chemical composition of the electrolyte in the battery, so as to shorten the battery life.

A more efficient battery charging principle for standby VRLA batteries involves the use of what is known as the Intermittent Charge Control (ICC) principle, as described in reference M Bhatt, W G Hurley, W H Wölfle, "A New Approach to Intermittent Charging of Valve-Regulated Lead-Acid Batteries in Standby Applications", *IEEE Transactions on Industrial Electronics*, vol. 52, no. 5, pp. 1337-1342, October 2005.

The ICC principle consists of four distinct operating modes, as shown in FIG. 1. In Mode 1, a battery is charged with a charge current of $0.1 C_{rated}$ A, where $C_{rated}$ is the rated battery capacity in Ah. The purpose of Mode 1 is to charge the battery to a high state of charge (SOC) of over 85%. When the battery voltage triggers the upper threshold voltage ($V_{ut}$), the operating mode changes from Mode 1 to Mode 2. In Mode 2, the battery is kept at open circuit to reduce the battery internal resistances built up in Mode 1, and provide more voltage head room for Mode 3. When the battery voltage drops below a lower threshold voltage ($V_{lt}$), the operating mode changes from Mode 2 to Mode 3. In Mode 3, the battery is charged with pulsed-currents with a peak current value of $0.05 C_{rated}$ A, a period of 30 seconds and a current duty cycle (D) of 33.3%. The purpose of Mode 3 is to charge the battery to full SOC. When the battery voltage reaches the upper threshold voltage again, the operating mode proceeds to Mode 4. In Mode 4, the battery is fully charged and it is kept at open circuit. The battery voltage drops due to self-discharging in Mode 4. When the battery voltage drops below a restart charge voltage threshold ($V_r$), which indicates an SOC of 97%, the charging cycle is restarted starting with Mode 1.

The advantage of the ICC principle is that this charging regime prevents the battery from overcharging, while at the same time keeping the battery at high SOC to prevent sulfation.

However, it has been found that the reaction rate in the electrolyte doubles for every 10° C. increase in temperature. This in turn causes corrosion at the positive grid, and increases water loss and generates extra heat, which could lead to thermal runaway.

Temperature compensation schemes exist for the float battery charging method. This involves the adjustment of the float voltage to prevent thermal runaway when the temperature is high, and prevent cell self-discharge when the temperature is low. The temperature compensated battery charger adjusts the float charging voltage based on the sensed ambient temperature or battery temperature. When the temperature increases, the charging voltage is accordingly decreased.

However, no temperature compensation technique is currently provided under the ICC principle. It is therefore an object of the present invention to provide a temperature compensation for pulsed battery-charging schemes, such as those using the ICC principle, in order to improve the battery lifetime.

SUMMARY OF THE INVENTION

According to a first aspect of the present invention, there is provided a method for compensating for temperature effects in a pulsed battery-charging scheme with an average charging current less than the root-mean-square (rms) current, characterised by varying the ratio of the average charging current to rms current as a function of the battery ambient temperature. The method may comprise the steps of: when the battery ambient temperature is less than or equal to a threshold temperature, increasing the ratio of the average charging current to rms current as the battery ambient temperature increases; and when the battery ambient temperature is higher than the threshold temperature, maintaining the ratio of the average charging current to rms current at a constant level. The threshold temperature may be equal to or approximately equal to the rated temperature of a battery to be charged.

Preferably, varying the ratio of average charging current to rms current comprises varying the duty cycle of the pulsed current. In one embodiment, the battery has a rated duty cycle $D_{Rated}$, and a rated temperature $T_{Rated}$, and the method further comprises maintaining the duty cycle at the rated value when the battery ambient temperature is higher than $T_{Rated}$.

The method may further comprise varying an upper threshold charging voltage as a function of the battery ambient temperature. The method may comprise the steps of: when the battery ambient temperature exceeds a threshold temperature, decreasing the upper threshold charging voltage as the battery ambient temperature increases; and when the battery ambient temperature is less than or equal to the threshold temperature, maintaining the upper threshold charging voltage at a constant level. Where the battery has a rated upper threshold charging voltage $V_{ut}^{Rated}$, and a rated temperature $T_{Rated}$, the method may comprise maintaining the upper threshold charging voltage at the rated value when the battery ambient temperature is less than or equal to $T_{Rated}$.

In one embodiment of the invention, the battery has a rated temperature, $T_{Rated}$, and a rated upper threshold charging voltage, $V_{ut}^{rated}$, and when the battery ambient temperature is higher than $T_{Rated}$, an upper threshold charging voltage is decreased, the ratio of average charging current to rms current is kept constant, and when the battery ambient temperature is less than or equal to $T_{Rated}$, the ratio of average charging current to rms current is decreased while the upper threshold charging voltage is maintained at the rated value.

In one embodiment, a pulsed battery-charging scheme may comprise charging a battery with a constant current until a certain voltage level is reached. After a relaxation period, the battery is charged for a short period of time with pulse currents and is then kept in an open circuit (or quasi open circuit) condition. When the voltage drops below a defined value, the pulse current charge starts again.

An advantage of this arrangement is that the battery is prevented from overcharging when the temperature is higher than the rated temperature and, because the ratio of average current to rms current is kept constant (e.g. at the rated value), charging time is reduced and the battery is protected from thermal runaway. When the temperature is low, the charging voltage increases for a given charging current. This low temperature effect is compensated by decreasing the ratio of average current to rms current to counteract the extra voltage rise. Thus, the potential danger of overcharging at high temperature is alleviated and the danger of undercharging at low temperature is compensated by charging more energy into the battery.

The method is particularly applicable to a pulsed battery-charging scheme that uses the intermittent charge control (ICC) principle. In this embodiment, the method comprises the steps of:
(a) charging the battery with a constant charge current until the battery voltage reaches a upper threshold charging voltage;
(b) placing the battery in low current charge, open circuit or quasi open circuit mode until the battery voltage self-discharges to a value below a lower threshold charging voltage;
(c) charging the battery with a pulsed charging current until the battery voltage reaches the upper threshold charging voltage;
(d) when the battery voltage reaches the upper threshold charging voltage, placing the battery in open circuit or quasi open circuit mode;
(e) repeating steps (a) to (d) when the battery voltage drops below a restart charge voltage threshold;
wherein the upper threshold charging voltage and the ratio of average charging current to rms current are temperature-dependent.

According to a second aspect of the present invention, there is provided a battery charger system capable of performing the method of the present invention.

DETAILED DESCRIPTION OF THE DRAWINGS

The method of the present invention will be described with reference to a pulsed battery-charging scheme using the ICC principle. A temperature compensation algorithm for a VRLA battery when being charged using the ICC principle, as a function of temperature, should meet two requirements. Firstly, the battery should maintain high SOC in Mode 4. Secondly, the rates of water decomposition and grid corrosion should be minimized, so as to prolong the battery service life.

Figure 1:
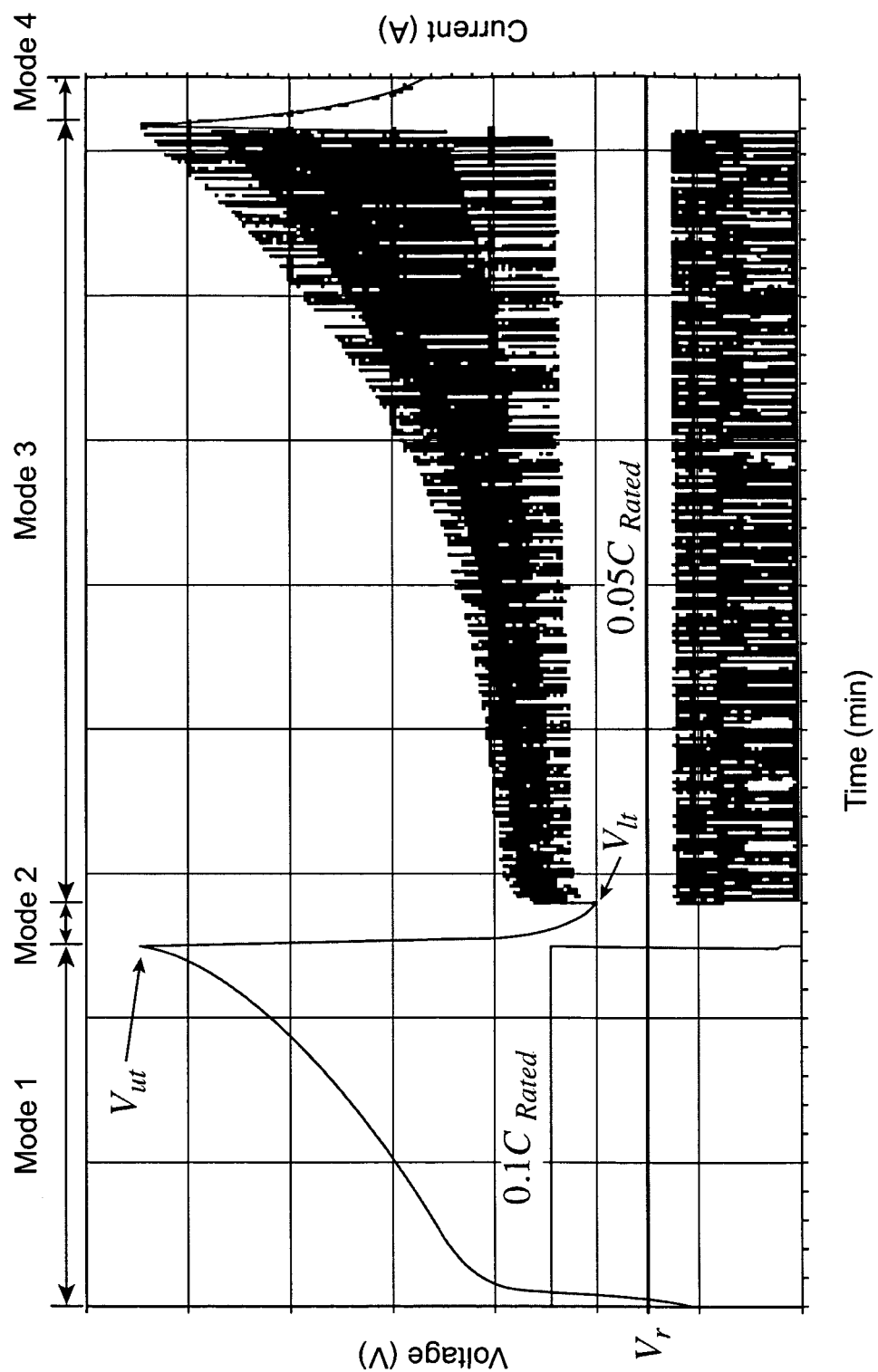
FIG. 1 is a graph of the operating modes of the ICC principle.
Figure 2:
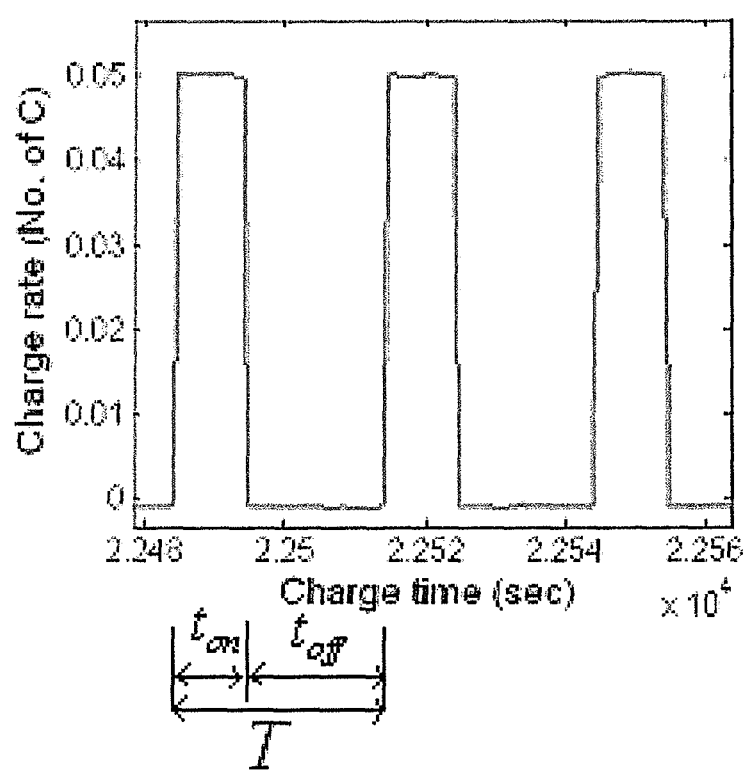
FIG. 2 is a graph of a typical current pulse used to charge a battery under the ICC principle.

It has been found that when charging a battery using the ICC principle, high battery ambient temperature lowers the charging voltage for a given charge current. Conversely, when the battery ambient temperature is low, the charging voltage increases for a given charge current. The invention uses a temperature compensation algorithm which takes account of the relationship between temperature and the charging voltage, by changing the $V_{ut}$, the upper threshold voltage, and D, the duty cycle of the periodic current pulse which is used to charge the batteries, i.e. the ratio of when the current pulse is on, $t_{on}$ to the period of the pulse, T, as can be seen from FIG. 2

$$D = \frac{t_{on}}{T} \quad (1)$$

where $$T = t_{on} + t_{off} \quad (2)$$

The algorithm decreases $V_{ut}$ when the temperature is higher than $T_{Rated}$, to prevent the battery from overcharging, while keeping D at the rated value, in order to shorten the charging time and protect the battery from thermal runaway.

Conversely, when the temperature is lower than $T_{Rated}$, the algorithm decreases D, to alleviate the extra voltage rise, while $V_{ut}$ is kept at the rated value, to avoid charging the battery at a higher voltage. However, D is bounded by $D_{min}$, which is determined by the minimum average charging current in Mode 3.

The temperature compensation algorithm which implements these features is therefore a hybrid temperature algorithm, and is expressed in equations (1) and (2) below $$D(T) = \begin{cases} D_{Rated} : T > T_{Rated} \\ \frac{1}{20}[(0.33 - D_{min})*T + 25*D_{min} - 1.6 : T \le T_{Rated} \end{cases} \quad (1)$$

$$V_{ut}(T) = \begin{cases} V_{ut}^{Rated} - N_{cell}*(V_{tcpc})*(T - T_{Rated}) : T > T_{Rated} \\ V_{ut}^{Rated} : T \le T_{Rated} \end{cases} \quad (2)$$

where T is the battery ambient temperature in degree Celsius, $T_{Rated}$ is the rated temperature of the battery, $D_{Rated}$ is the rated duty cycle, D(T) is the duty cycle at temperature T, $D_{min}$ is the minimum current duty cycle, $V_{ut}^{Rated}$ is the rated upper threshold voltage in V, $N_{cell}$ is the number of cells, $V_{tcpc}$ is the temperature compensation factor in V/cell and $V_{ut}(T)$ is the upper threshold voltage at temperature T in V. It can therefore be seen that the proposed temperature compensation algorithm operates in two different modes, namely above and below the rated temperature.

Figure 3:
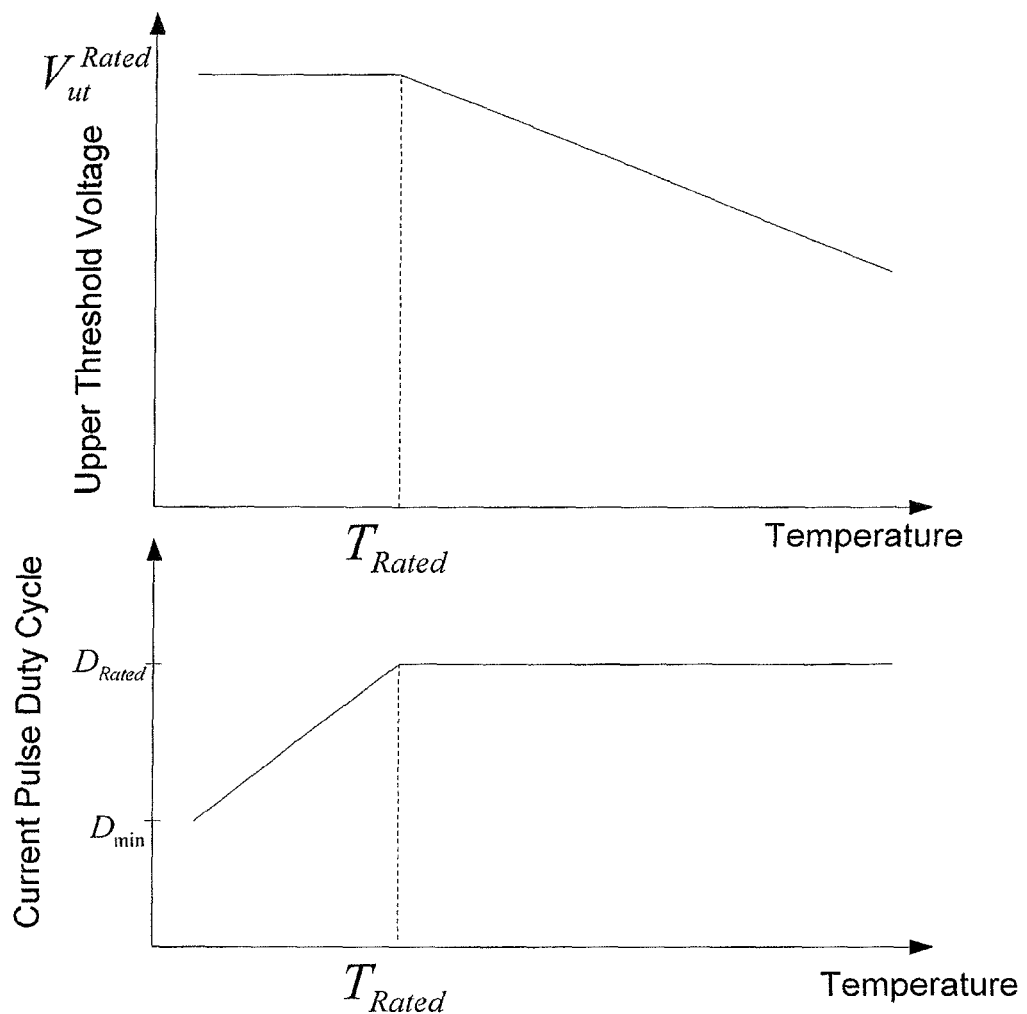
FIG. 3 is a temperature compensation algorithm for use with ICC principle.

The change of $V_{ut}$ and D at different temperatures when the algorithm is implemented is illustrated in FIG. 3.

Figure 4:
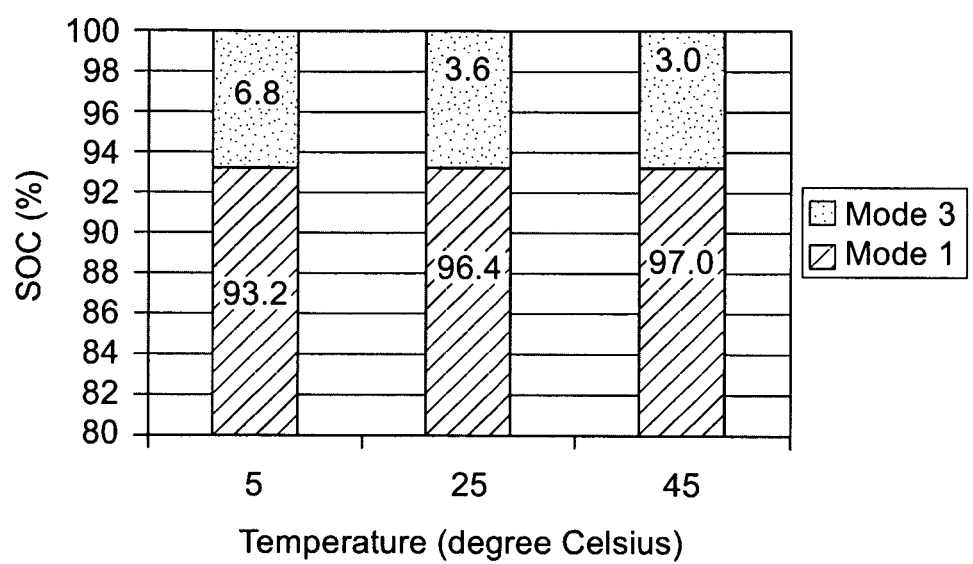
FIG. 4 shows the performance of the ICC principle when used in conjunction with temperature compensation.

FIG. 4 shows the performance of this temperature compensation algorithm for one particular battery under test. In this example, the battery under test is a Genesis 12V, 16Ah VRLA battery, G12V16EP, with the charger settings being $D_{Rated}$=33%, $T_{Rated}$=25° C., $D_{min}$=16.7%, $N_{cell}$=6, $V_{tcpc}$=0.004 V and $V_{ut}^{Rated}$=14.7 V.

Figure 5:
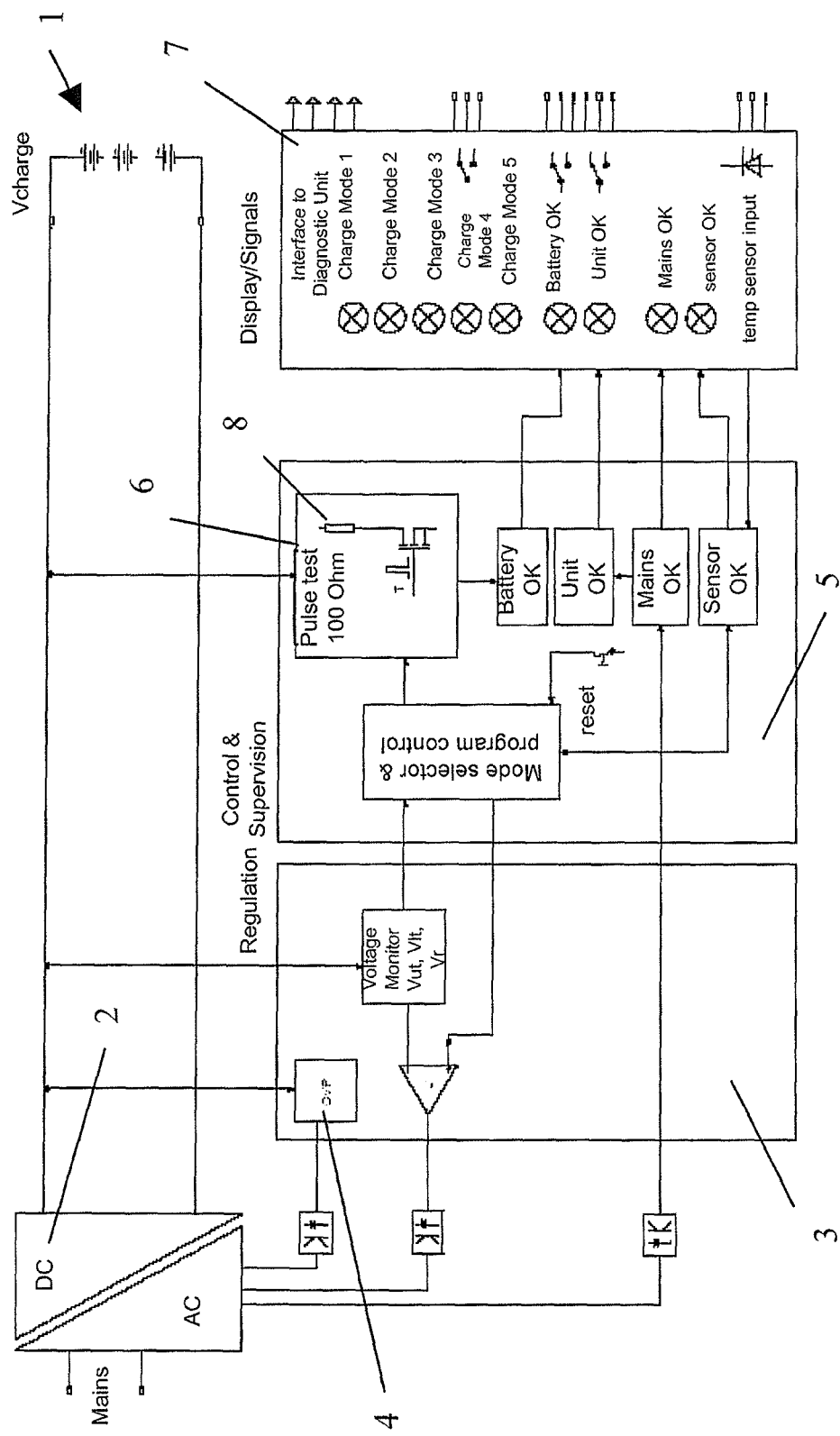
FIG. 5 is a block diagram of a battery charger according to an embodiment of the present invention.

A battery charger 1 according to an embodiment of the present invention is shown in FIG. 5. The charger comprises an AC/DC converter 2 with secondary side voltage regulation 3 and robust reliable primary side charge current limiting. An additional independent over-voltage protection (OVP) 4 protects the charger from over-voltage due to loss of control in the regulation loop. All the necessary timing and program control is done by a microcontroller 5. It commands the voltage control loop 3 and the battery test 6 and generates the interface to the diagnostic unit 7. The diagnostic unit provides an indication to the user of the current charge mode of the charger. The charger 1 is also connected to a temperature sensor which provides an input of the battery ambient temperature.

For loading the battery during pulse test (Mode 5), a reliable resistor 8 is used as a power dissipative element. In order to test the battery, a short test load current is regularly drawn (after charging). During the test, the charge current is set to zero. Voltage readings taken during the pulse test are used to generate the signal "Battery OK". In order to neutralize the test load discharge current, the same amount of charge must be given back to the battery. This may be done with a short refresh charge following each test impulse.

It will therefore be appreciated that while the basic ICC principle adopts constant current to charge a battery until it reaches a certain voltage level, and then it continues the charging by the use of current pulses, the temperature compensation algorithm of the present invention alters both the charge voltage and the duty cycle of the current pulse simultaneously, in order to compensate for temperature impact.

The application of temperature compensation to the basic ICC principle provides a number of advantages when compared to the basic ICC principle. Firstly, the potential danger of overcharging at high temperature is alleviated. Furthermore, the danger of undercharging at low temperature is compensated, by charging more energy into the battery in Mode 3. As a result, a more efficient battery charging technology is provided which extends the life of a battery.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method for compensating for temperature effects in a pulsed battery-charging scheme with an average charging current less than the root-mean-square (rms) current, and not maintaining constant power charging regardless of temperature comprising:
   when the battery ambient temperature is less than or equal to a threshold temperature, increasing the ratio of the average charging current to rms current as the battery ambient temperature increases and maintaining the upper threshold charging voltage at a constant level; and
   when the battery ambient temperature is higher than the threshold temperature, maintaining the ratio of the average charging current to rms current at a constant level and decreasing the upper threshold charging voltage as the battery ambient temperature increases.

2. A method as claimed in claim 1, wherein increasing the ratio of average charging current to rms current comprises increasing the duty cycle of the pulsed current.

3. A method as claimed in claim 2, wherein the battery-charging scheme is for charging a battery having a rated duty cycle $D_{Rated}$, and a rated temperature $T_{Rated}$, and further comprising:
   maintaining the duty cycle at the rated value when the battery ambient temperature is higher than $T_{Rated}$.

4. A method as claimed in claim 1, wherein the battery-charging scheme is for charging a battery having a rated upper threshold charging voltage $V_{ut}^{Rated}$, and a rated temperature $T_{Rated}$, and further comprising:
   maintaining the upper threshold charging voltage at the rated value when the battery ambient temperature is less than or equal to $T_{Rated}$.

5. A method as claimed in claim 1, wherein the battery-charging scheme is for charging a battery having a rated temperature, $T_{Rated}$, and a rated upper threshold charging voltage, $V_{ut}^{rated}$ further comprising:
   when the battery ambient temperature is higher than $T_{Rated}$, decreasing an upper threshold charging voltage as the battery ambient temperature increases while maintaining the ratio of average charging current to rms current constant; and
   when the battery ambient temperature is less than or equal to $T_{Rated}$, decreasing the ratio of average charging current to rms current as the battery ambient temperature decreases while maintaining the upper threshold charging voltage at the rated value.

6. A method as claimed in claim 1, wherein the pulsed battery-charging scheme uses the intermittent charge control (ICC) principle, and wherein the method comprises the steps of:
   (a) charging the battery with a constant charge current until the battery voltage reaches a upper threshold charging voltage;
   (b) placing the battery in low current charge, open circuit or quasi open circuit mode until the battery voltage self-discharges to a value below a lower threshold charging voltage;
   (c) charging the battery with a pulsed charging current until the battery voltage reaches the upper threshold charging voltage;
   (d) when the battery voltage reaches the upper threshold charging voltage, placing the battery in open circuit or quasi open circuit mode;
   (e) repeating steps (a) to (d) when the battery voltage drops below a restart charge voltage threshold;
   wherein the upper threshold charging voltage and the ratio of average charging current to rms current are temperature-dependent.

7. A battery charger using a pulsed battery-charging scheme with an average charging current less than the root-mean-square (rms) current, and not maintaining constant power charging regardless of temperature constructed and arranged to:
   increase the ratio of the average charging current to rms current as the battery ambient temperature increases and maintain the upper threshold charging voltage at a constant level when the battery ambient temperature is less than or equal to a threshold temperature; and
   maintain the ratio of the average charging current to rms current at a constant level and decrease the upper threshold charging voltage as the battery ambient temperature increases when the battery ambient temperature is higher than the threshold temperature.

8. A battery charger as claimed in claim 7, for charging a battery having a rated temperature, $T_{Rated}$, and a rated upper threshold charging voltage, $V_{ut}^{rated}$, further constructed and arranged to:
   decrease an upper threshold charging voltage as the battery ambient temperature increases while maintaining the ratio of average charging current to rms current constant when the battery ambient temperature is higher than $T_{Rated}$; and
   decrease the ratio of average charging current to rms current as the battery ambient temperature decreases while maintaining the upper threshold charging voltage at the rated value, when the battery ambient temperature is less than or equal to $T_{Rated}$.

9. A battery charger as claimed in claim 7, wherein increasing the ratio of average charging current to rms current comprises increasing the duty cycle of the pulsed current.

10. A battery charger as claimed in claim 9, for charging a battery having a rated duty cycle $D_{Rated}$, and a rated temperature $T_{Rated}$, further constructed and arranged to:

maintain the duty cycle at the rated value when the battery ambient temperature is higher than $T_{Rated}$.

\* \* \* \* \*